US006503690B1

(12) United States Patent
Uno et al.

(10) Patent No.: US 6,503,690 B1
(45) Date of Patent: *Jan. 7, 2003

(54) OPTICAL INFORMATION RECORDING MEDIUM, METHOD FOR PRODUCING THE SAME, AND METHOD FOR RECORDING AND REPRODUCING OPTICAL INFORMATION

(75) Inventors: Mayumi Uno, Osaka (JP); Noboru Yamada, Osaka (JP); Katsumi Kawahara, Osaka (JP)

(73) Assignee: Matsushita Electric Industrial Co., Ltd., Kadoma (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/132,022

(22) Filed: Aug. 10, 1998

(30) Foreign Application Priority Data

Aug. 12, 1997 (JP) .............................................. 9-217627

(51) Int. Cl.$^7$ ................................................. G11B 7/26
(52) U.S. Cl. ................. 430/270.13; 430/945; 428/64.5; 428/64.6; 369/275.2; 369/275.4
(58) Field of Search ....................... 430/270.13, 270.12, 430/273.1, 945; 428/64.5, 64.6, 912, 913; 369/275.2, 275.4

(56) References Cited

U.S. PATENT DOCUMENTS

| 4,461,807 A | 7/1984 | Mori et al. ................ 430/945 |
| 4,606,018 A | 8/1986 | Sagiki et al. .............. 369/2.79 |
| 4,661,420 A | 4/1987 | Nakamura et al. .......... 369/288 |
| 4,670,345 A | * 6/1987 | Morimoto et al. ..... 430/270.13 |
| 4,680,742 A | 7/1987 | Yamada et al. ............... 369/13 |
| 4,744,055 A | * 5/1988 | Hennessey .................. 365/113 |
| 4,913,949 A | 4/1990 | Steininger et al. ......... 428/64.1 |
| 4,954,379 A | * 9/1990 | Nishida et al. ........ 430/270.13 |
| 4,984,231 A | * 1/1991 | Yasuoka et al. ....... 430/270.13 |
| 5,098,761 A | * 3/1992 | Watanabe et al. ...... 430/270.13 |
| 5,108,846 A | 4/1992 | Steininger .............. 204/192.16 |
| 5,194,363 A | * 3/1993 | Yoshioka et al. ........... 430/945 |
| 5,221,588 A | * 6/1993 | Morimoto et al. ..... 430/270.13 |

(List continued on next page.)

FOREIGN PATENT DOCUMENTS

| EP | 0 499 273 A2 | 8/1992 |
| EP | 0 588 305 | 3/1994 |
| EP | 0 594 277 A1 | 4/1994 |

(List continued on next page.)

OTHER PUBLICATIONS

XX The Merck Index, front cover, Merk Co., Inc.

Primary Examiner—Martin Angebranndt
(74) Attorney, Agent, or Firm—Merchant & Gould P.C.

(57) ABSTRACT

The present invention provides an optical information recording medium having excellent characteristics in repetitive recording and a sufficient C/N ratio. The optical information recording medium includes a recording layer containing Ge, Te and Sb and a diffusion preventing layers in contact with the recording layer. A composition ratio of Ge, Te and Sb in the recording layer has numerical values which lie within the range represented by the area ABCDE in a ternary phase diagram of Ge, Te and Sb, where the points A, B, C, D and E are as follows:

A ($Ge_{50}Te_{50}$), B ($Ge_{22.5}Sb_{22.0}Te_{55.5}$), C ($Ge_{17.0}Sb_{41.5}Te_{41.5}$), D ($Ge_{48.0}Sb_{26.0}Te_{26.0}$), E ($Ge_{65}Te_{35}$)

The diffusion layer contains at least one compound selected from an oxide, a nitride, a nitrogen oxide, a carbide and a fluoride.

20 Claims, 6 Drawing Sheets

U.S. PATENT DOCUMENTS

| | | | |
|---|---|---|---|
| 5,283,133 A | | 2/1994 | Tsutsumi et al. ............. 369/13 |
| 5,289,453 A | | 2/1994 | Ohno et al. .................. 369/100 |
| 5,294,523 A | * | 3/1994 | Nagata et al. ......... 430/270.13 |
| 5,395,735 A | * | 3/1995 | Nagata et al. ......... 430/270.13 |
| 5,418,030 A | | 5/1995 | Tominaga et al. .......... 428/64.1 |
| 5,424,106 A | | 6/1995 | Yamada et al. ............. 428/64.1 |
| 5,431,978 A | | 7/1995 | Nakamura et al. .......... 369/288 |
| 5,442,619 A | * | 8/1995 | Van Uijen et al. ...... 430/270.13 |
| 5,448,551 A | | 9/1995 | Miyagawa et al. ....... 369/275.4 |
| 5,459,019 A | | 10/1995 | Kato et al. ................... 430/945 |
| 5,484,686 A | | 1/1996 | Maeda et al. ........... 430/270.13 |
| 5,521,901 A | | 5/1996 | Okada et al. ............. 369/275.2 |
| 5,545,454 A | | 8/1996 | Yamada et al. ............. 428/64.1 |
| 5,580,632 A | * | 12/1996 | Ohkawa et al. ......... 430/270.13 |
| 5,581,539 A | | 12/1996 | Horie et al. .............. 369/275.4 |
| 5,591,501 A | | 1/1997 | Ovshinsky et al. .......... 430/945 |
| 5,652,037 A | | 7/1997 | Ohkawa et al. ......... 430/270.12 |
| 5,726,969 A | | 3/1998 | Moriya et al. ............ 369/275.1 |
| 5,733,622 A | | 3/1998 | Starcke et al. .............. 428/64.1 |
| 5,745,475 A | | 4/1998 | Ohno et al. ............... 369/275.4 |
| 5,764,619 A | | 6/1998 | Nishiuchi et al. ......... 369/275.1 |
| 5,776,574 A | * | 7/1998 | Honguh et al. ......... 430/270.13 |
| 5,787,061 A | * | 7/1998 | Tsuchiya et al. ............... 369/58 |
| 5,811,217 A | * | 9/1998 | Akahira et al. ......... 430/270.13 |
| 5,818,808 A | | 10/1998 | Takada et al. .............. 369/116 |
| 5,878,018 A | | 3/1999 | Moriya et al. ............ 369/275.1 |
| 5,882,759 A | | 3/1999 | Hirotsune et al. ......... 428/64.1 |
| 5,914,214 A | * | 6/1999 | Ohta et al. ............. 430/270.13 |
| 5,958,649 A | | 9/1999 | Hirotsune ............... 430/270.13 |
| 5,976,659 A | | 11/1999 | Abiko ....................... 428/64.1 |
| 6,004,646 A | | 12/1999 | Ohno et al. ................. 428/64.1 |
| 6,096,399 A | | 8/2000 | Yoshinari ................... 428/64.1 |
| 6,153,063 A | * | 11/2000 | Yamada et al. ........ 204/192.22 |

FOREIGN PATENT DOCUMENTS

| | | | | |
|---|---|---|---|---|
| EP | 0 644 537 A2 | | 3/1995 | |
| EP | 0 706 177 | | 4/1996 | |
| EP | 0 732 690 A1 | | 9/1996 | |
| EP | 0 825 595 | | 2/1998 | |
| EP | 0 849 729 A2 | | 6/1998 | |
| JP | 56-145530 | | 11/1981 | |
| JP | 57-50330 | | 3/1982 | |
| JP | 61-89889 | | 5/1986 | |
| JP | 62-196181 | | 8/1987 | |
| JP | 63-50931 | | 3/1988 | |
| JP | 63-171453 | | 7/1988 | |
| JP | 1-211249 | * | 8/1989 | ............ 430/270.13 |
| JP | 1-276453 | | 11/1989 | |
| JP | 2-037548 | | 2/1990 | |
| JP | 2-78041 | | 3/1990 | |
| JP | 2-105351 | | 4/1990 | |
| JP | 2-265051 | | 10/1990 | |
| JP | 2-265052 | | 10/1990 | |
| JP | 3-113844 | | 5/1991 | |
| JP | 3-248338 | | 11/1991 | |
| JP | 04-52188 | * | 2/1992 | ............ 430/270.13 |
| JP | 4-069833 | | 3/1992 | |
| JP | 4-102243 | | 4/1992 | |
| JP | 04-143937 | * | 5/1992 | ............ 430/270.13 |
| JP | 5-159360 | | 6/1993 | |
| JP | 5-274726 | | 10/1993 | |
| JP | 5-282705 | | 10/1993 | |
| JP | 5-298747 | | 11/1993 | |
| JP | 5-298748 | | 11/1993 | |
| JP | 5-325261 | | 12/1993 | |
| JP | 7-105574 | | 4/1995 | |
| JP | 8-85261 | | 4/1996 | |
| JP | 8-190734 | | 7/1996 | |
| JP | 8-329528 | | 12/1996 | |
| JP | 8-329529 | | 12/1996 | |
| JP | 10-49916 | | 2/1998 | |
| WO | WO 96/00441 | | 1/1996 | |
| WO | WO97/34298 | * | 9/1997 | ............ 430/270.13 |

* cited by examiner

OPTICAL INFORMATION RECORDING MEDIUM, METHOD FOR PRODUCING THE SAME, AND METHOD FOR RECORDING AND REPRODUCING OPTICAL INFORMATION

BACKGROUND OF THE INVENTION

1. Field of the Invention

The present invention relates to an optical information recording medium on which information can be recorded at a high density and high speed by using optical techniques such as irradiation of laser beams, a method for producing such an optical information recording medium and a method for recording and reproducing optical information with such an optical information recording medium.

2. Description of the Prior Art

An optical magnetic recording medium or a phase-changeable recording medium is known as a medium on which information can be recorded in large capacity and reproduced and rewritten at a high speed. Such a transportable optical recording medium is expected to be more important in a highly information-oriented society. The improvements in the function of applications and in the quality of graphic information require larger capacity and higher-speed recording or reproducing of the medium.

These optical recording media utilize a difference in the optical characteristics of the recording material created by locally irradiating the recording material with laser beams. For example, for the optical magnetic recording medium, a difference in the angle of rotation on a plane of polarization of a reflected light, which is created by a difference in the magnetized state, is utilized for recording. Furthermore, for the phase-changeable recording medium, an amount of reflected light in the crystalline state different from that in the amorphous state when light with a specific wavelength is used is utilized for recording. The phase-changeable recording medium is advantageous because erasing recorded information and overwriting information can be simultaneously performed by adjusting the output power of the laser, so that it is possible to rewrite information signals at a high speed.

FIGS. 5 and 6 show exemplary structures of layers of conventional optical information recording media. A resin such as polycarbonate, polymethyl methacrylate (PMMA) or glass can be used for a substrate 101. The substrate 101 may have a guide groove.

A recording layer 103 is formed of a material that has states having different optical characteristics and can change between the different states reversibly. In the case of a rewritable phase change type optical disk, a chalcogenide such as a material containing Te and Se as a main component can be used for the recording layer 103.

Protecting layers 102, 104 and 106 serve to protect the recording layer in such a manner that the recording layer material is prevented from being oxidized, evaporated or distorted. Furthermore, it is possible to adjust the absorption of the optical information recording medium or a difference in the reflectance between a recorded portion and a erased portion by adjusting the thickness of the protective layers. Thus, the protective layers also serve to adjust the optical characteristics of the medium. Moreover, a material for the protective layer is required to have good adhesiveness with a material forming the recording layer and the substrate, and good weather resistance so that the protective layer itself is not cracked.

Examples of the material for the protective layer include a dielectric such as a sulfide such as ZnS, an oxide such as $SiO_2$, $Ta_2O_5$ or $Al_2O_3$, a nitride such as $Si_3N_4$ or AlN, a nitrogen oxide such as SiON or AlON, a carbide, a fluoride or the like, or suitable combinations thereof. Especially, $ZnS$—$SiO_2$ has been generally used, because the layer composed of the material has less stress and good adhesiveness to the recording layer.

As shown in FIG. 5, in general, the protecting layers 102, 104 are formed on both sides of the recording layer 103. It has been proposed to produce a layered structure composed of two protective layers 102, 106 including different materials from the other, as shown in FIG. 6, so that the adhesiveness with the substrate and the characteristics in repetitive recording of information are improved.

A reflection layer 105 can be formed on the protecting layer 104 for the purpose of radiating heat and allowing the recording layer to absorb light effectively, but the reflection layer is not necessarily provided. The reflection layer is generally formed of a metal such as Au, Al, Cr or the like, or an alloy of these metals.

In general, an overcoating layer or a dummy substrate is located on the reflection layer 105 so that the optical recording information medium is not oxidized and dust or the like does not become attached to the medium, although those are not shown in FIGS. 5 and 6. The dummy substrate can be bonded with an ultraviolets-curing resin.

As a material for the recording layer, a Ge—Sb—Te-based material has been investigated extensively, because the material is excellent in weather resistance and the characteristics in repetitive recording of information.

For example, Japanese Laid-Open Patent Publication (Tokkai-Sho) No. 61-89889 discloses a material for recording represented by $Ge_{(1-x)}Sb_{4x}Te_{(1-5x)}$ (0<x<1). The material provides a substantial change of reflectance with a phase-change between an amorphous state and a crystalline state by irradiation of light beams. The material also can make the sensitivity to recording higher, because the material has a lower crystallization temperature to eliminate energy for crystallization. However, this investigation takes no account of a repetitive recording of information which involves a phase change between an amorphous state and a crystalline state.

Japanese Laid-Open Patent Publication (Tokkai-Sho) No. 62-53886 discloses a material for recording represented by $(Sb_xTe_{(1-x)})_yGe_{(1-y)}$ (x=0.05–0.7, y=0.4–0.8), and an example in which the irradiation of laser beams to a recording layer composed of the material can change the transmittance of the layer. However, this investigation takes no account of reversibility of the change and a repetitive recording of information.

Japanese Laid-Open Patent Publication (Tokkai-Sho) No. 62-196181 discloses a rewritable medium including a Ge—Sb—Te-based material. A recording layer is composed of $Ge_{23}Sb_{46}Te_{31}$ or the like, and has a protecting layer of $SiO_2$, AlN or the like on the recording layer. The reflectance of the recording layer can vary reversibly by changing the power level of a semiconductor laser beam having a wavelength of 830 nm. However, this investigation takes no account of a repetitive recording of information and a preferable composition of the recording layer for irradiation of laser beams having a short wavelength of 680 nm or less.

The difference in an optical constant of a recording layer composed of a Ge—Sb—Te-based material between an amorphous state and a crystalline state becomes narrower as the wavelength of the laser beams shortens for high-density recording. The narrower difference in optical characteristics such as reflectance makes the degree of signal change smaller, which restricts the density of recording.

Conventionally, a material having a composition ratio obtainable by adding some Sb to a stoichiometric composition ratio of $Ge_2Sb_2Te_5$, or ones that are close to the composition ratio, has been used for a Ge—Sb—Te-based material. It is believed that excellent characteristics in repetitive recording can be obtained, only because such a composition ratio is used for the recording layer. On the other hand, a composition ratio in the near side to GeTe on the GeTe—$Sb_2Te_3$ line can enlarge the difference in an optical constant between the two states. However, such a composition ratio is not suitable for a rewritable medium, because the characteristics in repetitive recording of information deteriorate. The composition ratio far from the stoichiometric ratio is generally believed to cause the deterioration in repetitive recording.

SUMMARY OF THE INVENTION

Therefore, with the foregoing in mind, it is the object of the present invention to provide an optical information recording medium having sufficient difference in an optical constant with shortwave light beams and sufficiently excellent characteristics in repetitive recording so as to record and reproduce optical information effectively at a high density, and to provide a method for producing such an optical information recording medium and a method for recording and reproducing optical information with such an optical information recording medium.

An optical information recording medium of the present invention includes a recording layer having reversibly changeable optical characteristics. The recording layer contains at least three elements of Ge, Te and Sb, and the composition ratio of Ge, Te and Sb in the recording layer has numerical values that lie within the range represented by the area ABCDE in a ternary phase diagram of Ge, Te and Sb, where the points A, B, C, D and E are as follows:

A ($Ge_{50}Te_{50}$), B ($Ge_{22.5}Sb_{22.0}Te_{55.5}$), C ($Ge_{17.0}Sb_{41.5}Te_{41.5}$), D ($Ge_{48.0}Sb_{26.0}Te_{26.0}$), E ($Ge_{65}Te_{35}$),

The optical information recording medium also includes a diffusion preventing layer in contact with the recording layer. The diffusion preventing layer contains at least one compound selected from a oxide, a nitride, a nitrogen oxide, a carbide and a fluoride.

This makes it possible to provide a medium having a large difference in optical characteristics between an amorphous portion and a crystalline portion and excellent characteristics in repetitive recording.

In the optical information recording medium, the composition ratio of the recording medium is not close to the stoichiometric ones of $Ge_2Sb_2Te_5$ but included in the above area. The combination of the recording medium with the diffusion preventing layer having the above ingredient makes a difference in optical characteristics large and characteristics in repetitive recording excellent. Thus, the present invention provides an optical information recording medium with the recording layer having a different composition ratio from ones that has been believed to be preferable, and the diffusion preventing layer having a material that cannot easily diffuse into other layers.

According to another aspect of the present invention, a method for producing an optical information recording medium includes a step of forming a recording layer having reversibly changeable optical characteristics by sputtering with a target containing at least three elements of Ge, Te and Sb. A composition ratio of Ge, Te and Sb in the target has numerical values that lie within the range represented by the area ABCDE in a ternary phase diagram of Ge, Te and Sb, where the points A, B, C, D and E are as described above.

The method also includes a step of forming a diffusion preventing layer in contact with the recording layer. The diffusion preventing layer is formed so as to contain at least one compound selected from the group consisting of a oxide, a nitride, a nitrogen oxide, a carbide and a fluoride.

This makes it possible to produce effectively a medium which has a large difference in optical characteristics between an amorphous portion and a crystalline portion and excellent characteristics in repetitive recording.

According to another aspect of the present invention, a method for recording and reproducing optical information utilizes an optical information recording medium including a recording layer having reversibly changeable optical characteristics, and a diffusion preventing layer in contact with the recording layer. The recording layer contains at least three elements of Ge, Te and Sb, and a composition ratio of Ge, Te and Sb in the recording layer has numerical values which lie within the range represented by the area ABCDE in a ternary phase diagram of Ge, Te and Sb, where the points A, B, C, D and E are as described above. The diffusion preventing layer contains at least one compound selected from an oxide, a nitride, a nitrogen oxide, a carbide and a fluoride.

The method utilizes laser beams focused on a microspot on the optical information recording medium to record or reproduce optical information. A power level of the laser beams is fluctuated between a first power level $P_1$ and a second power level $P_2$ to introduce a change of an optical state of the recording layer, that is, a change of the optical information. The change of the optical information is selected from recording, erasing and overwriting. On the other hand, the optical information is reproduced with the laser beams of a third power level $P_3$.

The first power level $P_1$ is an amorphous state formation level which allows a portion in the recording layer to reversibly change to an amorphous state by irradiation of the laser beams. The second power level $P_2$ is a crystalline state formation level which allows a portion in the recording layer to reversibly change to a crystalline state by irradiation of the laser beams. The third power level $P_3$ is a reproduction level which is lower than the power levels $P_1$ and $P_2$, and does not influence the optical state of the recording layer and provides a sufficient reflectance so as to reproduce the optical information.

This makes it possible to record, reproduce and rewrite optical information effectively at a high density by utilizing an optical information recording medium which has a large difference in optical characteristics between an amorphous portion and a crystalline portion, and excellent characteristics in repetitive recording.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples with reference to the accompanying drawings.

Figure 1:
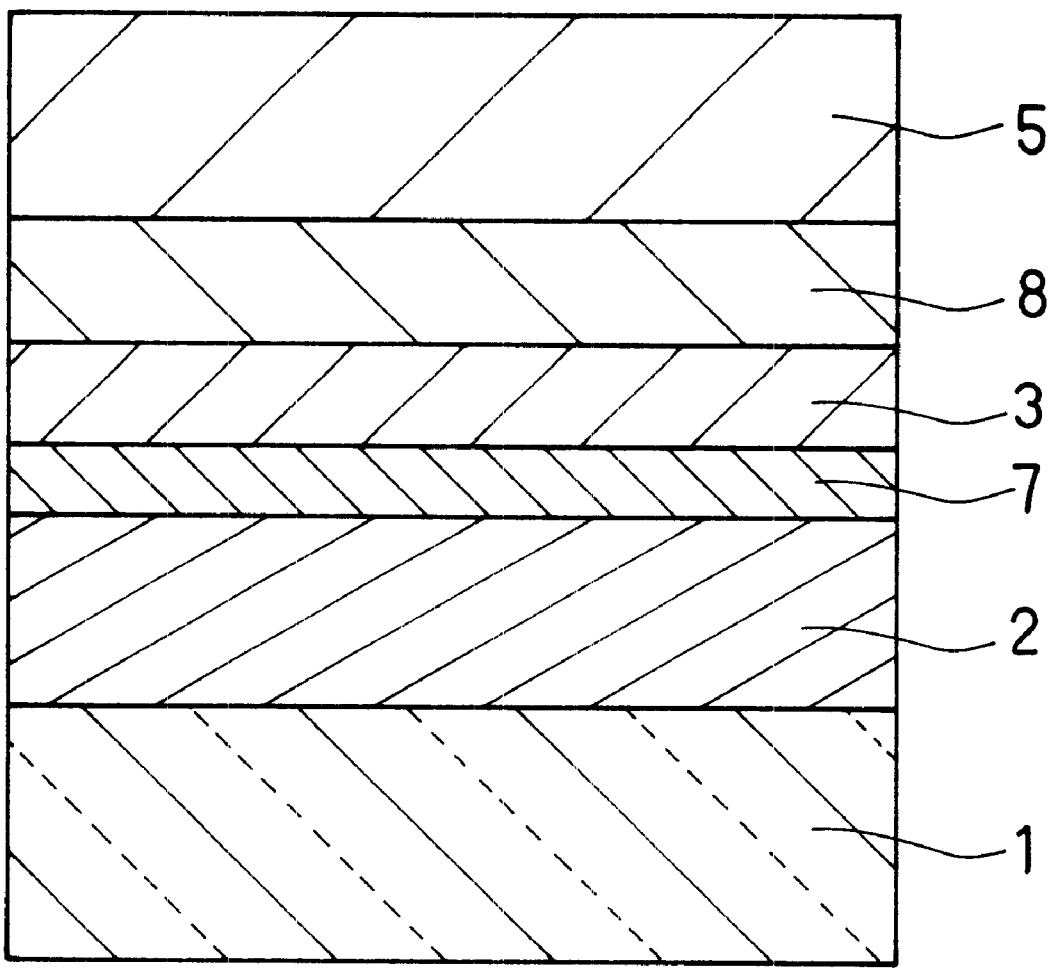
FIG. 1 is a cross-sectional view illustrating an exemplary structure of a layer of an optical information recording medium of the present invention.

FIG. 1 shows an exemplary structure of a layer of an optical information recording medium of the present invention. This optical information recording medium includes a substrate 1 and a multilayer formed on the substrate 1. The multilayer is composed of a protective layer 2, a first diffusion preventing layer 7, a recording layer 3, a second diffusion preventing layer 8 and a reflection layer 5.

The diffusion preventing layers 7, 8 are formed for the purpose of preventing atoms from diffusing between the recording layer 3 and layers adjacent to the recording layer 3. In the embodiment shown in FIG. 1, the diffusion preventing layer is preferably formed on both of the surfaces of the recording layer 3. However, the diffusion preventing layer can be formed only on either one of the surfaces of the recording layer.

When the diffusion preventing layer is formed on only one surface of the recording layer, it is preferable to form the diffusion preventing layer on the side that has a larger load of heat at the recording layer interface, namely, on the side where the temperature-rise at the recording layer interface at the time of marking and erasing is large. This is generally the side the laser beams strike. The effect of the diffusion preventing layer in preventing atoms from diffusing is noteworthy when the protecting layer contains sulfur or a sulfide.

The optical information recording medium is not limited to the structure as described above but can have other structures. For example, in the structure as shown in FIG. 1, another protective layer can be formed between the diffusion preventing layer 8 and the reflection layer 5 as a second protecting layer; the protecting layer 2 can be substituted with a material used for the diffusion preventing layer 7; an additional layer can be formed between the substrate 1 and the protecting layer 2; the reflection layer 5 can be eliminated; and the reflection layer 5 can be composed of two or more layers.

The substrate 1 is preferably formed of a resin such as polycarbonate or PMMA, or glass and preferably includes a guiding groove for guiding laser beams.

The protecting layer 2 is formed for the purpose of protecting the recording layer, improving the adhesiveness with the substrate, adjusting the optical characteristics of the medium or the like. The protective layer 2 is preferably formed of a dielectric such as a sulfide such as ZnS, an oxide such as $SiO_2$, $Ta_2O_5$ or $Al_2O_3$, a nitride such as $Ge_3N_4$, $Si_3N_4$ or AlN, a nitrogen oxide such as GeON, SiON or AlON, a carbide, a fluoride or the like, or combinations thereof (e. g. , ZnS—$SiO_2$).

The reflection layer 5 is preferably formed of a metal such as Au, Al, Cr, Ni or the like, or an alloy of metals suitably selected from these metals.

The recording layer 3 is formed of a phase-changeable material containing the elements of Ge, Te and Sb as the main component. A composition ratio of Ge, Te and Sb in the recording layer has numerical values which lie within the range represented by the area ABCDE as shown in FIG. 2, a ternary phase diagram of Ge, Te and Sb, where the points A, B, C, D and E are as follows:

A ($Ge_{50}Te_{50}$), B ($Ge_{22.5}Sb_{22.0}Te_{55.5}$), C ($Ge_{17.0}Sb_{41.5}Te_{41.5}$), D ($Ge_{48.0}Sb_{26.0}Te_{26.0}$), E ($Ge_{65}Te_{35}$),

When more Ge than that in the above range is present, the material does not easily crystallize because of increasing crystallization temperature, which makes an effective rewrite difficult. When more Sb than that in the above range is present, the material does not easily turn into the crystalline state because of higher stability of an amorphous state. When less Ge than that in the above range is present, the material cannot keep the difference between an amorphous state and a crystalline state sufficiently large.

Figure 2:
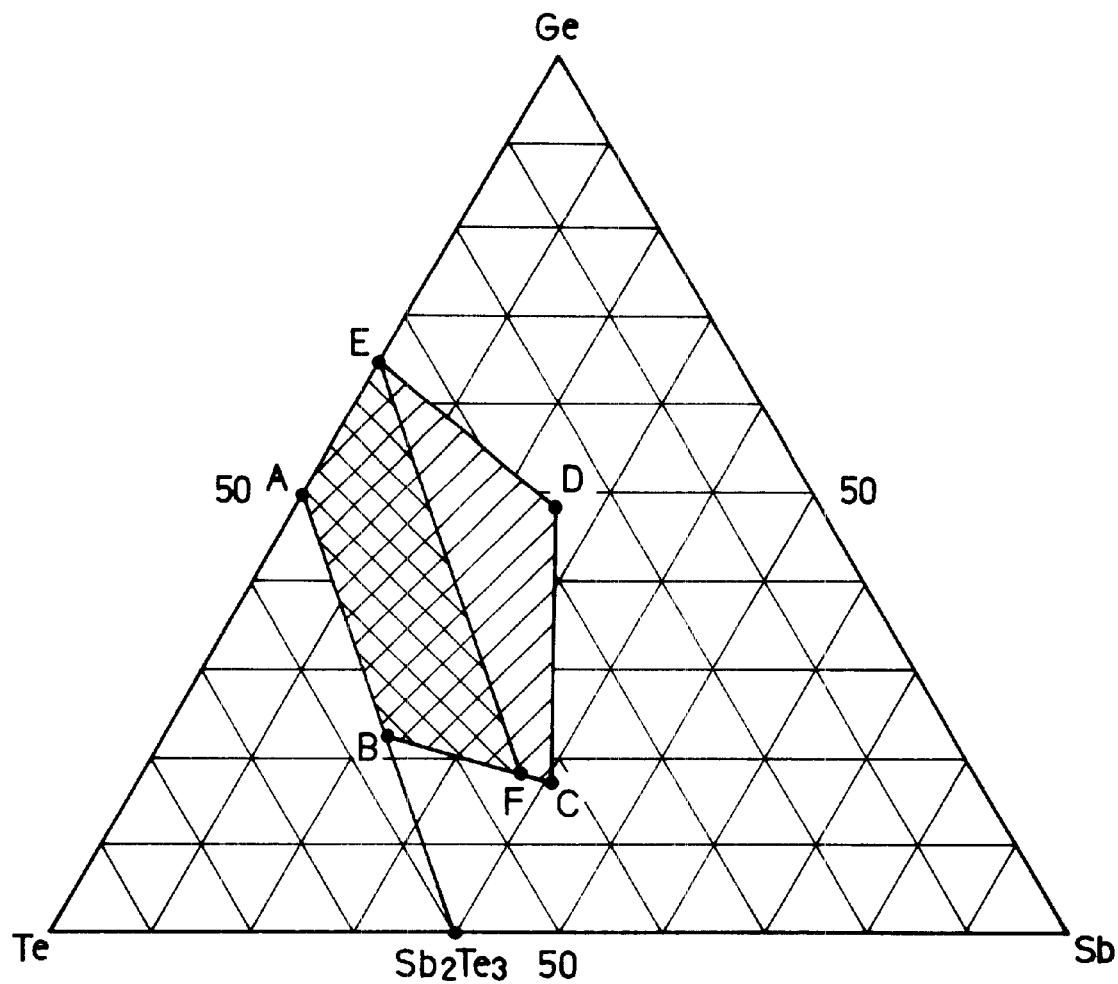
FIG. 2 is a ternary phase diagram of Ge, Te and Sb showing a preferable composition range of a recording layer in the optical information recording medium of the present invention.

A composition ratio of the elements preferably has numerical values that lie within the range represented by the area ABFE as shown in FIG. 2, where additional point F is represented by F ($Ge_{18.0}Sb_{37.6}Te_{44.4}$).

The recording layer 3 may include impurities such as a sputtering gas component (Ar, Kr, or the like), H, C, $H_2O$ or the like. The recording layer can include minor components (around 10 atom % or less) other than Ge, Sb and Te for various purposes. However, it does not matter even if such a component is included, as long as the object of the present invention can be achieved.

The thickness of the recording layer 3 is preferably in the range from 5 nm to 25 nm. When the thickness is less than 5 nm, the recording material is hardly formed into a layer. When the thickness is more than 25 nm, heat transfer becomes large in the recording layer, so that cross erasion is likely to occur in adjacent portions during high-density recording.

The diffusion preventing layers 7, 8 preferably contain at least one compound selected from the group of an oxide, a nitride, a nitrogen oxide, a carbide and a fluoride as the main component, and more preferably composed of a material free from sulfur or a sulfide. For example, an oxide of Si, Al, Cr or Ta, a nitride of Ge, Cr, Si, Al, Nb, Mo, Fe, Ti or Zr, a nitrogen oxide of Ge, Cr, Si, Al, Nb or Mo, a carbide of Cr, Si, Al, Ti, Ta or Zr, or combinations thereof can be used for the layers. When the diffusion preventing layers 7, 8 include such a material as the main component, the layers 7, 8 may include impurities of around 10 atom % or less.

In any case, as a material for the diffusion preventing layer, a material not tending to diffuse between the recording layer, or a material not affecting the change in optical characteristics if it diffuses into the recording layer, is preferable. A material excellent in adhesive characteristics to the recording layer is also preferable.

Thus, as a material for the diffusion preventing layer, a material containing GeN, GeON, GeXN or GeXON as the main component is more preferable, where X represents at least one element selected from the elements belonging to Groups IIIa, IVa, Va, VIa, VIIa, VIII, Ib and IIb, and C in a periodic table according to IUPAC rules of nomenclature. A Ge-containing layer including such a material can improve the characteristics in repetitive recording.

The element of X is added mainly for the purpose of improving the weather resistance. X is preferably at least one element selected from Ti, V, Cr, Mn, Cu, Zn, Zr, Nb, Mo, Pd, Ag, Cd, Hf, Ta, W, Fe, Co, Ni, Y, La and Au, more preferably at least one element selected from the group consisting of Cr, Mo, Mn, Ti, Zr, Nb, Ta, Fe, Co, Ni, Y and La, and further more preferably at least one element selected from the group consisting of Cr, Mo, Mn, Ni, Co and La.

The reason why the addition of X improves the durability of the recording medium is believed to be that the added X suppresses the introduction of moisture into the diffusion preventing layer, although this is not firmly confirmed. A possible mechanism is as follows. In a GeN or GeON layer, Ge—N bonds change to Ge—O or Ge—OH bonds under the conditions of high temperature and high humidity and are ready to corrode. When X that is oxidized relatively easily is added to the layer, the phenomenon of oxidation or hydration of Ge is suppressed. It is also possible that the production of dangling bonds of Ge present in a GeN or GeON layer is suppressed by the addition of X, and thus the formation of Ge—OH bonds is suppressed. It is believed that this is the reason why preferable examples of X are Cr, Mo, Mn, Ti, Zr, Nb, Ta, Fe, Co, Ni, Y and La (further more preferably Cr, Mo, Mn, Ni, Co and La).

Figure 3:
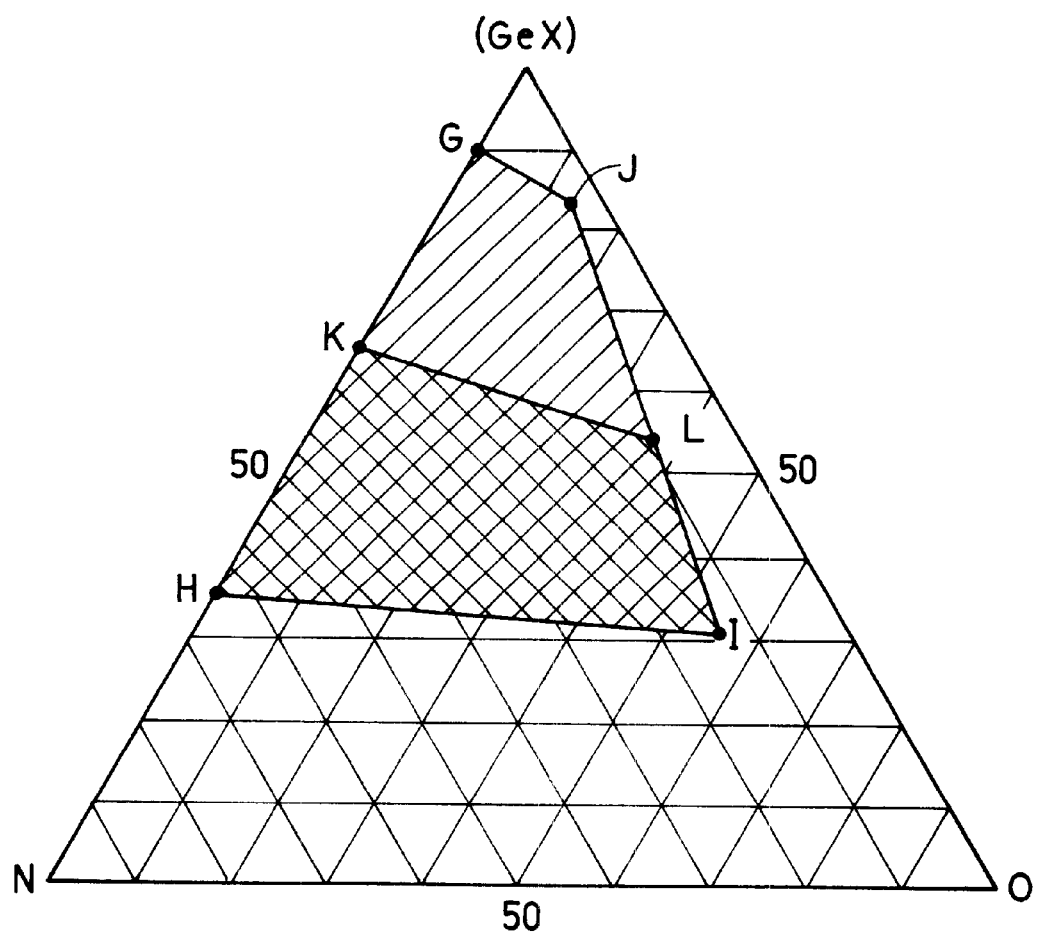
FIG. 3 is a ternary phase diagram of (GeX), O and N showing a preferable composition range of a diffusion preventing layer in the optical information recording medium of the present invention.

The diffusion preventing layer is preferably represented by $(Ge_{1-x}X_x)_aO_bN_c$ (x is at least one element as described above, $0 \leq x < 1$, $0 < a < 1$, $0 \leq b < 1$, $0 < c < 1$, $a+b+c=1$), and the composition ratio of (GeX), O and N in the diffusion preventing layers 7 and 8 preferably has numerical values that lie within the range represented by the area GHIJ in the ternary phase diagram of (GeX), O and N as shown in FIG. 3, where the points G, H, I and J are as follows:

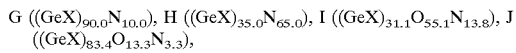

and more preferably the area KHIL in the ternary phase diagram of FIG. 3, where additional points K and L are as follows:

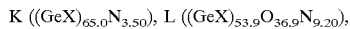

where (GeX) represents the total amount of Ge and X.

According to the composition ratio in the above range as described above, excess atoms, that is, an oxygen or nitrogen atom that does not bond to a Ge or X atom, or a Ge or X atom that does not bond to an oxygen or nitrogen atom, can be reduced. Such excess atoms may diffuse into the recording layer to prevent a change in optical characteristics.

The first diffusion preventing layer 7 is susceptible to heat load during repetitive recording, and the composition ratio in this layer is preferably within the range represented by the area KHIL (in order words, a stoichiometric composition in the vicinity of $Ge_3N_4$—$GeO_2$ line in the ternary phase diagram). On the other hand, it is preferable not to comprise excess N or O in the composition ratio of the second diffusion preventing layer 8 in view of the adhesiveness with the recording layer. Therefore, the composition ratio is preferably slightly on the side of the apex of GeX than the $Ge_3N_4$—$GeO_2$ line.

Thus, in the case where the first diffusion preventing layer 7 on the surface on which laser beams are incident has a composition represented by $(Ge_{1-m}X_m)_aO_bN_c(a>0, b \geq 0, c>0, 0<m<1$, preferably $0<m \leq 0.5)$, and the second diffusion preventing layer on the opposite surface has a composition represented by $(Ge_{1-n}X_n)_dO_eN_f(d>0, e \geq 0, f>0, 0<n<1$, preferably $0<n \leq 0.5)$, m is preferably smaller than n. In the case where the diffusion preventing layer is formed in contact with the substrate, in order to improve adhesiveness between the substrate and the diffusion preventing layer, it is preferable to form the diffusion preventing layer of a material comprising oxygen or to increase the content of oxygen at the interface between the diffusion preventing layer and the substrate.

In order to reduce excess atoms, the diffusion preventing layers 7, 8 preferably have (GeX) at such a composition ratio that X is 50 atom % or less (i.e., $0<k<0.5$ in $Ge_{1-k}X_k$). When the content of X is more than 50 atom % of the content of GeX, the substance X floods into the recording layer after repeated recording, and this tends to interfere with the change in the optical characteristics of the recording layer. For the same reason, the content of X is more preferably 40 atom % or less of the content of GeX, and most preferably 30 atom % or less. On the other hand, the content of X is preferably 10 atom % or more of the content of GeX. The content of X of less than 10 atom % may not provide as useful an effect from the addition of the substance X.

The thickness of the diffusion preventing layer is preferably 1 nm or more. The thickness of less than 1 nm reduces the effect as the diffusion preventing layer. The upper limit of the thickness of the diffusion preventing layer, for example the diffusion preventing layer on the side closer to irradiation of laser beams than the recording layer, is in the range where a sufficient intensity of laser beams so as to record information in or reproduce information from the recording layer can be obtained. The intensity of the laser beams can be suitably set depending on the laser power or the material used for the recording layer.

The diffusion preventing layers 7, 8 and the protecting layer 2 may include impurities such as a sputtering gas component (Ar, Kr, or the like), H, C, $H_2O$ or the like. However, it does not matter even if such a component is included, as long as the object of the present invention can be achieved.

Figure 4:
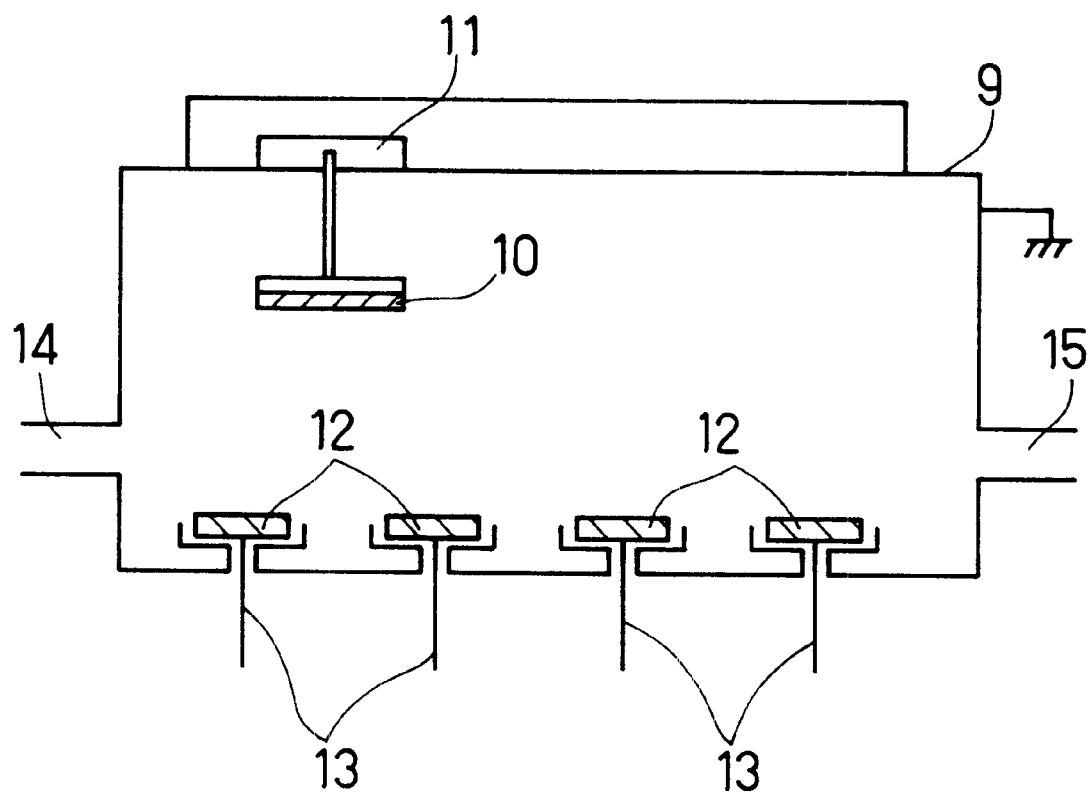
FIG. 4 is a view illustrating an exemplary film-forming apparatus for the optical information recording medium of the present invention.

Next, a method for producing the optical information recording medium of the present invention will be described. A multilayer structure forming the optical information recording medium can be produced by sputtering, a vacuum evaporation method, a chemical vapor deposition (CVD) method or the like. In this embodiment, sputtering is used. FIG. 4 is a schematic view showing an exemplary apparatus forming film by sputtering.

A vacuum pump (not shown) is connected to a vacuum container 9 through an air outlet 15 so that a high degree of vacuum can be maintained in the vacuum container 9. A constant flow rate of Ar, nitrogen, oxygen or a mixed gas thereof can be supplied from a gas supply inlet 14. A substrate 10 is attached to a driving apparatus 11 for revolving the substrate 10. Each sputtering target 12 is connected to a cathode 13. The shape of the target is, for example, a disk having a diameter of about 10 cm and a thickness of about 6 mm. The cathode 13 is connected to a direct current power source or a high frequency power source (not shown) through a switch. Furthermore, the vacuum container 9 is grounded so that the vacuum container 9 and the substrate 10 are utilized as anodes.

As a target for forming the recording layer 3, for example, a GeTeSb target can be used. A composition ratio of the target preferably has numerical values that lie within the range represented by the area ABCDE, more preferably ABFE in FIG. 2.

In the process for producing the optical information recording medium performed by using such an apparatus, a diffusion preventing layer is formed before and/or after a process for forming a recording layer.

When the diffusion preventing layers 7, 8 are formed by reactive sputtering, a film with good quality can be obtained.

It is preferable to use an alloy of Ge and X or a mixture of Ge and X. Moreover, nitrogen can be included in the target. For example, in the case where GeCrN is formed as a diffusion preventing layer, a GeCr target or a GeCr target further provided with N can be used. Furthermore, it is preferable to use a mixed gas of rare gas and nitrogen ($N_2$) as a film-forming gas (sputtering gas). A mixed gas of rare gas and gas containing nitrogen atoms such as $N_2O$, $NO_2$, NO, $N_2$ or a mixture thereof can be used as a film-forming gas. Furthermore, in order to avoid a excessively rigid film or a film having a large stress, it is preferable to add a trace of oxygen to the film-forming gas. A film with good quality may be obtained. The total pressure of the film-forming gas is preferably 1.0 mTorr or more.

Furthermore, when the diffusion preventing layers 7, 8 containing nitrogen are formed by reactive sputtering, the partial pressure of nitrogen is preferably 10% or more of the total pressure of the film-forming gas. This is because an excessively low partial pressure makes it difficult to form a nitride and thus difficult to form a nitride having a desired composition. A preferable upper limit of the partial pressure is in the range that provides stable discharge, for example, about 60%.

When the diffusion layer is formed in contact with the substrate, a portion closer to the substrate of the layer is preferably formed in a film-forming gas including oxygen.

Next, a method for recording and/or reproducing optical information, and/or erasing the information in the thus obtained optical information recording medium of the present invention will be described.

For recording, reproducing and erasing signals, a semiconductor laser light source, an optical head including an object lens, a driving apparatus for guiding laser beams to a predetermined position for irradiation, a tracking control apparatus and a focusing control apparatus for controlling a position orthogonal to a track direction and a surface of a film, a laser driving apparatus for adjusting laser power, and a rotation control apparatus for rotating the optical information recording medium are used.

For recording and erasing signals, laser beams are focused on a microspot by the optical system, and the medium rotated by the rotation control apparatus is irradiated with the laser beams. Herein, a power level for the formation of an amorphous state that allows a portion in the recording layer to reversibly change to an amorphous state by irradiation of laser beams is represented by $P_1$. A power level for the formation of a crystalline state that allows a portion in the recording layer to reversibly change to a crystalline state by irradiation of laser beams is represented by $P_2$. Fluctuating the power of the irradiated laser beams between $P_1$ and $P_2$ generates a pulse to form or erase recorded marks. Thus, recording, erasing or overwriting optical information can be performed selectively. What is called a multiple pulse composed of pulse trains including a peak power level of $P_1$ is preferably utilized, although types of pulse other than the multiple pulse can be used.

On the other hand, signals from the recording medium obtained by irradiating the medium with laser beams having a power level $P_3$ are read by a detector so as to reproduce the information signals from the recorded marks. Herein, $P_3$ is a reproduction power level lower than the power levels $P_1$ and $P_2$, and the irradiation of laser beams having $P_3$ does not influence the optical state of the recorded marks and provides a sufficient reflectance so as to reproduce the recorded marks from the medium.

Examples of the conditions are as follows: the wavelength of the laser beams is 650 nm; the numerical aperture of the used object lens is 0.60; the signal system is an eight-sixteen modulation system; the minimum bit length is 0.28 μm/bit; the scanning speed of the laser beams in the track direction (linear velocity) is 12 m/s; the track pitch is 1.20 μm, i.e., a groove and a land (a portion between grooves) are alternately formed at every 0.60 μm on a substrate. However, a substrate may include grooves and lands formed at a different width ratio.

In the method for using the optical information recording medium, the conditions are not limited to those described above. The recording medium of the present invention can utilize laser beams having a wavelength of 680 nm or less for controlling optical information. The medium also can have the minimum bit length of 0.40 μm/bit or less and/or the track pitch of 1.40 μm or less to record the information at a higher density. Herein, the minimum bit length is measured in the direction along the groove, while the track pitch is an average of the total width of a pair of a groove and a land in the direction normal to the groove on the whole surface of the medium. Furthermore, the medium can meet the linear velocity of 8 m/s or more.

Thus, in the method for using the medium, the wavelength of the laser beams is preferably 680 nm or less, because the spot size of the laser beams is proportional to the wavelength. A larger spot is disadvantageous to high-density recording. The media of the present invention can realize the minimum bit length of 0.40 μm/bit or less to make the capacity of the medium larger.

The linear velocity is preferably 8 m/s or more, because the medium of the present invention can realize high-density recording and has a larger file. Such a larger file such as an image or picture information may require a high transferred rate. However, the linear velocity may be 8 m/s or less, so long as such a higher transferred rate is not necessary. For example, in the case that recording and reproducing are performed with further higher density, for example, by using laser beams having blue wavelengths, a relatively low linear velocity can provide a sufficiently high transferred rate.

Furthermore, it is preferable to perform what is called "land & groove recording" where recording, reproducing and erasing information signals are performed in both the groove portion and the land portion in a guiding groove, because this allows a medium to have a large capacity. In this case, it is necessary to form a suitable depth and shape of the guiding groove and a structure having a suitable reflectance of the medium so that cross-talk or cross-erase can be suppressed. As described above, in the case of land & groove recording, the medium preferably has an average of the track pitch of 1.40 μm or less.

EXAMPLES

The optical information recording medium having the same structure as shown in FIG. 1 was produced by sputtering as described above with an apparatus as shown in FIG. 4. A disk-shaped polycarbonate resin having a thickness of 0.6 mm and a diameter of 120 mm was used for a substrate 1. A material comprising ZnS and 20 mol % of $SiO_2$ was used for a protective layer 2. A phase-changeable material comprising Ge—Sb—Te alloy having a composition ratio of $Ge_{30}Sb_{17}Te_{53}$ was used for a recording layer 3. A material of GeCrN was used for diffusion preventing layers 7, 8. With respect to the reflection layer 5, Au was used. This medium was referred to as Sample 1.

Figure 5:
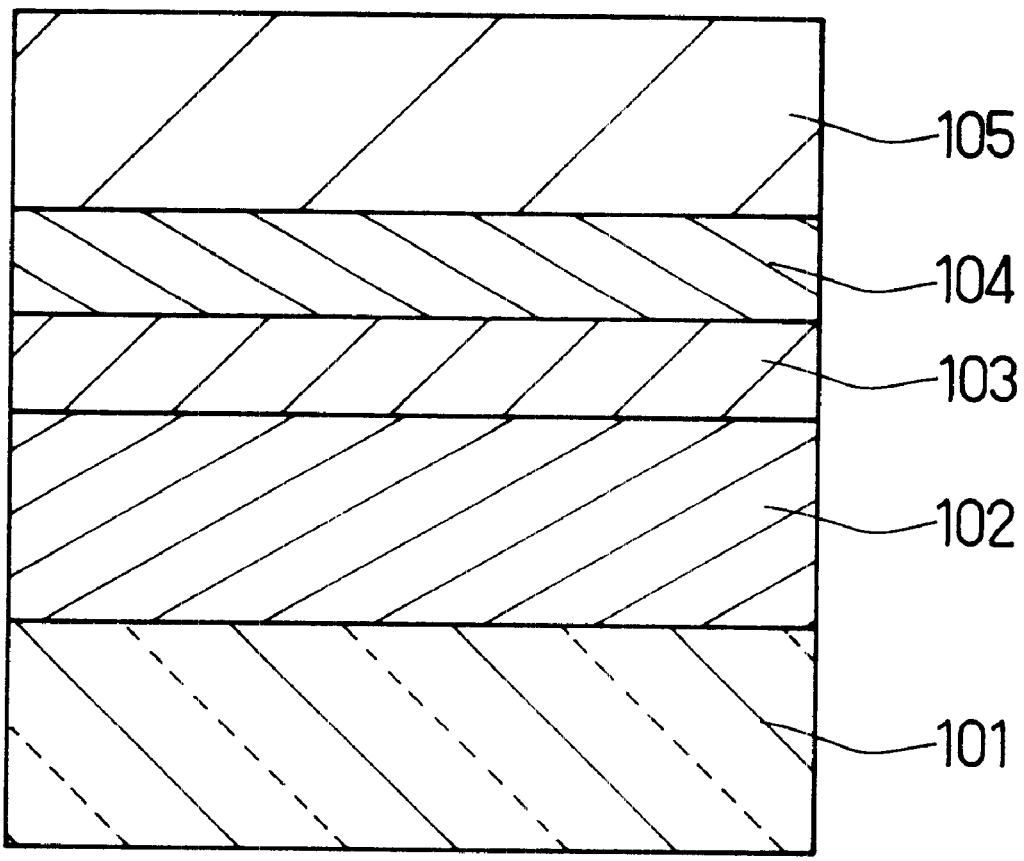
FIG. 5 is a cross-sectional view illustrating an exemplary conventional optical information recording medium.
Figure 6:
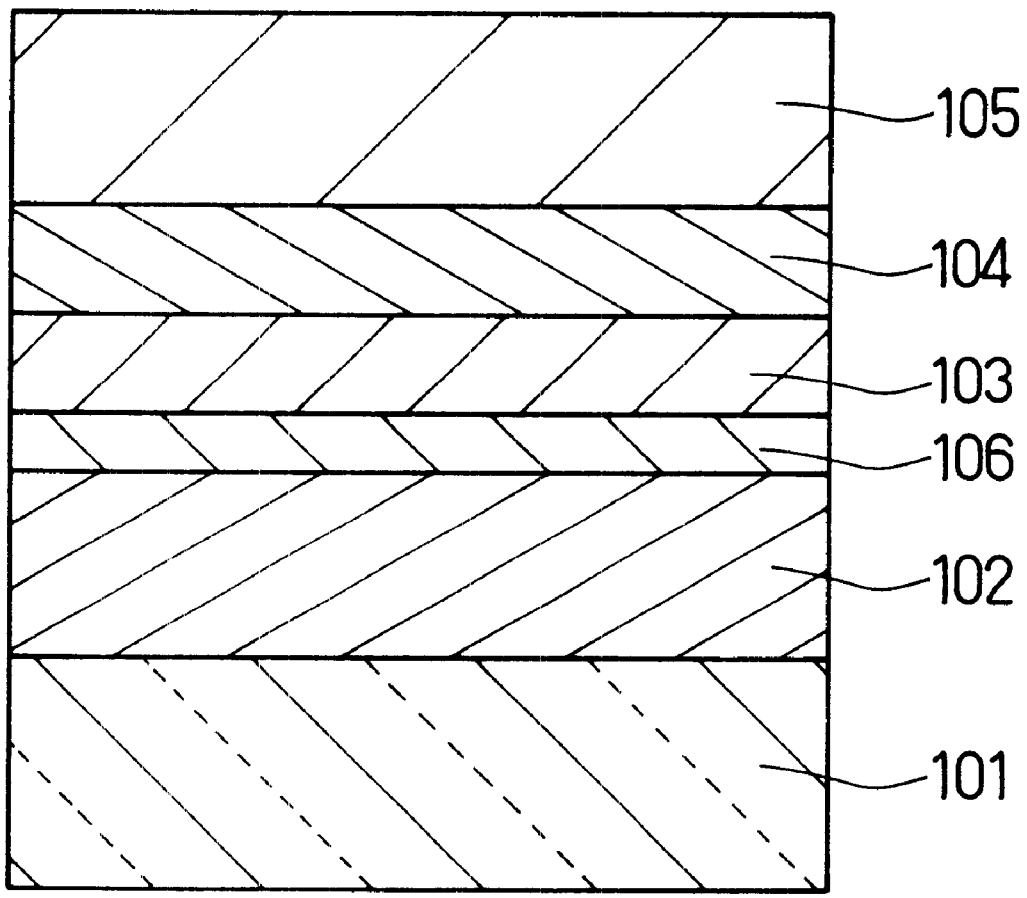
FIG. 6 is a cross-sectional view illustrating another exemplary conventional optical information recording medium.

For comparison, some media were produced in the same manner as Sample 1 except for the following:

In Sample 2, conventional Ge—Sb—Te alloy represented by $Ge_{21}Sb_{25}Te_{54}$ was used for the recording layer. In Sample 3, the medium had the same structure as shown in FIG. 5, that is, having no diffusion preventing layers. In the medium, the layers 101–105 and the substrate 101 were also composed of the same material as Sample 1. In Sample 4, the medium had the same structure as Sample 3, but had a conventional composition ratio represented by $Ge_{21}Sb_{25}Te_{54}$ in the recording layer.

In these media, the layers had thicknesses as follows:

The thicknesses of all the recording layers 3, 103 were 15 nm, and those of all the reflection layers 5, 105 were 30 nm. In Samples 1 and 2, the thicknesses of the first and the second diffusion preventing layers 7, 8 were 10 nm and 20 nm, respectively, and the protecting layer 2 had a thickness of 120 nm. In Samples 3 and 4, the thicknesses of the first and the second protecting layer 102, 104 were 130 nm and 20 nm, respectively. Concerning the thickness of the protecting layer, an integral multiple of the thickness may provide the same optical characteristics.

When forming the protective layer and the recording layer, a mixed gas of argon with 2.5 vol % of nitrogen was supplied at a constant flow rate and a total pressure of 1.0 mTorr and 0.5 mTorr, respectively, and DC powers of 1.27 W/cm$^2$ and RF powers of 5.10 W/cm$^2$, respectively, were supplied to cathodes.

When forming the reflection layer 5, argon gas was supplied at a total pressure of 3.0 mTorr, and a DC power of 4.45 W/cm$^2$ was supplied. Other rare gases than Ar such as Kr can be contained in the sputtering gas, as long as it allows sputtering.

When forming the diffusion preventing layer composed of GeCrN, a target of GeCr was used. In the target, the ratio of Cr atoms to Ge atoms was 20%. A mixed gas of argon with nitrogen in which a partial pressure of the nitrogen is 40% was supplied at a constant flow rate and a total pressure of 10 mTorr, and the total powers of sputtering of 6.37 W/cm$^2$ were supplied to cathodes.

For investigating the optical constants of the recording layers as described above, the same recording layers as those in Samples 1 and 2 (thickness:15 nm) were formed on quartz substrates. The constants were evaluated with laser beams having a wavelength of 650 nm. Herein, the optical constants of Samples 1 and 2 in a crystalline state are represented by $nc_1-ikc_1$ and $nc_2-ikc_2$, respectively, while those in an amorphous state of Samples 1 and 2 are represented by $na_1-ika_1$ and $na_2-ika_2$, respectively, where n is a refractive index and k is an absorption coefficient. The results were as follows: $\Delta n_1=nc_1-na_1=0.5$, $\Delta k_1=kc_1-ka_1=2.3$, $\Delta n_2=nc_2-na_2=0.2$ and $\Delta k_2=kc_2-ka_2=1.5$.

The result shows that the composition ratio of the recording layer in Sample 1 can make a difference in optical constant between the two states larger than that of the conventional composition ratio in Sample 2. Recording layers having a composition ratio in the near side to GeTe compared to that of Sample 1 can enlarge the difference in the optical constant between the two states. For high-density recording, the composition ratio that can provide $\Delta n$ of 0.25 or more and $\Delta k$ of 1.70 or more is preferable.

The results of the evaluation of the characteristics, C/N ratios and the characteristics in repetitive recording, of Samples 1 to 4 are shown in Table 1. The characteristics were evaluated with laser beams having a wavelength of 650 nm.

For the evaluation of the C/N ratio, marks having a length of 3T, the minimum length in eight-sixteen modulate system, were recorded on the grooves and the lands so that 3T may correspond to 0.41 $\mu$m at a linear velocity of 12 m/s.

The C/N ratio was evaluated on the basis of the average of the saturated C/N ratio on the grooves and the lands. In a sample denoted by "A", the average was 50 dB or more. In a sample denoted by "B", the average was 47 dB or more, but less than 50 dB. In a sample denoted by "C", the average was less than 47 dB.

For the evaluation of the characteristics in repetitive recording, random marks having lengths from 3T to 11T when the minimum mark length is 0.41 $\mu$m in eight-sixteen signal modulate system as described above were recorded on the grooves. The characteristics were evaluated on the basis of the ratio of a jitter value between front ends or rear ends of the marks to a window width T. The ratio was measured after 100,000 times of repetitive recording to determine the average increment in the ratio at the front ends and the rear ends with respect to the ratio measured after 10 times repetitive recording.

In a sample denoted by "A", the average increment was 3% or less. In a sample denoted by "B", the average increment was more than 3%, but 5% or less. In a sample denoted by "C", the average increment was more than 5%.

TABLE 1

| Sample No. | Composition of Recording Layer | Diffusion Preventing Layer | | C/N Ratio | Repetitive Recording |
|---|---|---|---|---|---|
| | | 1st Layer | 2nd Layer | | |
| 1 | $Ge_{30}Sb_{17}Te_{53}$ | GeCrN | GeCrN | A | A |
| 2 | $Ge_{21}Sb_{25}Te_{54}$ | GeCrN | GeCrN | C | A |
| 3 | $Ge_{30}Sb_{17}Te_{53}$ | No Layer | No Layer | A | C |
| 4 | $Ge_{21}Sb_{25}Te_{54}$ | No Layer | No Layer | C | C |

As shown in Table 1, the composition ratio rich in GeTe in Samples 1 and 3 can enhance the C/N ratio in the recorded mark, while the diffusion preventing layer containing germanium can improve the characteristics in repetitive recording.

Furthermore, Samples 5 to 10 were produced under the same conditions as Sample 1. These Samples had the same construction as Sample 1, and each layer was composed of the same material as Sample 1, except that the recording layers of Samples 5 to 10 had different composition ratios of $Ge_{27}Sb_{20}Te_{53}Ge_{35}Sb_{13}Te_{52}$, $Ge_{40}Sb_9Te_{51}$, $Ge_{27}Sb_{25}Te_{48}$, $Ge_{35}Sb_{20}Te_{45}$ and $Ge_{30}Sb_{30}Te_{40}$, respectively, and the reflection layers were composed of AlCr. In Samples 5 to 10, the thickness of the recording layer was 12 nm, and the thickness of the first diffusion preventing layer was 20 nm, and the thickness of the reflection layer was 30 nm. The thicknesses of the second preventing layer and the protecting layer were adjusted so as to reduce the phase difference between the grooves and the lands while keeping the reflectance difference between an amorphous portion and a crystalline portion sufficiently large.

Samples 11 to 14 also were produced under the same conditions as Sample 1. These Samples also had the same construction as Sample 1, and each layer was composed of the same material as Sample 1, except the first diffusion preventing layer and the second diffusion preventing layer. In Sample 11, the first diffusion preventing layer was composed of GeN and the second diffusion preventing layer was composed of ZrC. In Sample 12, the first diffusion preventing layer was composed of GeNiN and the second diffusion preventing layer was composed of CrC. In Sample 13, the first diffusion preventing layer and the second diffusion preventing layer were composed of $SiO_2$. In Sample 14, the first diffusion preventing layer and the second diffusion preventing layer were composed of $Cr_2O_3$.

Samples 15 and 16 were produced under the same conditions as Sample 1. These Samples basically have the same construction as Sample 1, and each layer was composed of the same material as Sample 1, but some layers had different thicknesses. The different points from Sample 1 are as follows: In Sample 15, an Au layer at a thickness of 10 nm was additionally formed between the substrate and the protecting layer, and the thicknesses of the protecting layer and the second diffusion preventing layer were 77 nm and 50 nm, respectively. In Sample 16, the thicknesses of the recording layer, the protecting layer the second diffusion preventing layer and the reflection layer were 12 nm, 40 nm, 77 nm and 40 nm, respectively.

Table 2 shows the results of the evaluation of these recording media.

TABLE 2

| Sample No. | Composition of Recording Layer | Diffusion Preventing Layer | | C/N Ratio | Repetitive Recording |
| --- | --- | --- | --- | --- | --- |
| | | 1st Layer | 2nd Layer | | |
| 5 | $Ge_{27}Sb_{20}Te_{53}$ | GeCrN | GeCrN | A | A |
| 6 | $Ge_{35}Sb_{13}Te_{52}$ | GeCrN | GeCrN | A | A |
| 7 | $Ge_{40}Sb_{9}Te_{51}$ | GeCrN | GeCrN | A | A |
| 8 | $Ge_{27}Sb_{25}Te_{48}$ | GeCrN | GeCrN | A | A |
| 9 | $Ge_{35}Sb_{20}Te_{45}$ | GeCrN | GeCrN | A | A |
| 10 | $Ge_{30}Sb_{17}Te_{53}$ | GeCrN | GeCrN | B | B |
| 11 | $Ge_{30}Sb_{17}Te_{53}$ | GeN | ZrC | A | B |
| 12 | $Ge_{30}Sb_{17}Te_{53}$ | GeNiN | CrC | A | B |
| 13 | $Ge_{30}Sb_{17}Te_{53}$ | $SiO_2$ | $SiO_2$ | A | A |
| 14 | $Ge_{30}Sb_{17}Te_{53}$ | $Cr_2O_3$ | $Cr_2O_3$ | A | A |
| 15 | $Ge_{30}Sb_{17}Te_{53}$ | GeCrN | GeCrN | A | A |
| 16 | $Ge_{30}Sb_{17}Te_{53}$ | GeCrN | GeCrN | A | A |

As shown in Table 2, Samples 5 to 16 provide sufficient C/N ratios, that is, the sufficient difference in optical characteristics, and the improved characteristics in repetitive recording.

Samples 1 to 14 were designed so that the reflectance in an amorphous state was lower than that in a crystalline state, while Samples 15 and 16 were designed so that the reflectance in an amorphous state was higher than that in a crystalline state.

The latter medium has a great advantage that it is easy to design a structure with what is called an absorption compensation effect to improve erasing characteristics. The effect can be obtained by keeping the ratio of an absorption of an amorphous portion (Ac) to an absorption of a crystalline portion (Aa) in a predetermined range more than one (Ac/Aa>1). On the other hand, noise tends to increase in the latter medium, because the total reflectance of an amorphous portion and a crystalline portion is larger than that in the former medium.

Furthermore, Sample 17 was produced under the same conditions as Sample 1. Sample 17 also had the same construction as Sample 1, and each layer was composed of the same material as Sample 1, except that the recording media had a composition ratio of $Ge_{30}Sb_{19}Te_{51}$ at a thickness of 10 nm, both of the diffusion preventing layers were composed of CrON at a thickness of 10 nm, and the thickness of the reflection layer was 10 nm.

This recording medium also was evaluated as described above. Marks having a length of 3T, the minimum length in eight-sixteen modulate system, were recorded on the grooves and the lands so that 3T may correspond to 0.41 µm at a linear velocity of 8 m/s. In this case, the minimum bit length was 0.28 µm/bit. The C/N ratio was evaluated on the 3T marks recorded on the groves and the lands with laser beams having a predetermined and suitable power. As a result, the C/N ratios were 53 dB or more on the grooves and the lands.

Concerning the characteristics in repetitive recording evaluated by the same manner as described above, the average increment in the ratio of Sample 17 was 3% or less. Thus, the medium of the present invention also can provide excellent characteristics in repetitive recording at a relatively slow linear velocity.

The present invention includes other types of the medium. For example, the medium can be designed to make no or little difference in the reflectance, but to provide a sufficient phase difference between the two states.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical information recording medium comprising:
   a substrate having a plurality of layers formed thereon, the plurality of layers further comprising:
   a first diffusion preventing layer;
   a recording layer having reversibly changeable optical characteristics in contact with the first diffusion preventing layer, the recording layer containing at least three elements of Ge, Te and Sb,
   wherein a composition ratio of Ge, Te and Sb in the recording layer has numerical values which lie within the range represented by the area ABFE in a ternary phase diagram of Ge, Te and Sb, where the points A, B, F and E are as follows:

A $(Ge_{50}Te_{50})$, B $(Ge_{22.5}Sb_{22.0}Te_{55.5})$, F $(Ge_{18.0}Sb_{37.6}Te_{44.4})$, E $(Ge_{65}Te_{35})$;

a second diffusion preventing layer in contact with the recording layer; and
   a protecting layer formed of a dielectric containing sulfur or a sulfide in contact with the first diffusion preventing layer or the second diffusion preventing layer,
   wherein the first and second diffusion preventing layers contain at least one compound selected from the group consisting of an oxide, a nitride, a nitrogen oxide, a carbide and a fluoride as a main component and wherein the first and second diffusion layers are substantially free of sulfur and prevent atoms from diffusing between the recording layer and layers adjacent to the recording layer.

2. The optical information recording medium according to claim 1, wherein the recording layer has a thickness in the range from 5 nm to 25 nm.

3. The optical information recording medium according to claim 1, wherein the first and second diffusion preventing layers have a thickness of 1 nm or more.

4. The optical information recording medium according to claim 1, wherein the first and second diffusion preventing layers are Ge-containing layers.

5. The optical information recording medium according to claim 4, wherein the Ge-containing layer contains at least one compound selected from the group consisting of GeN, GeON, GeXN, and GeXON as the main component, where X is at least one element selected from the group consisting of elements belonging to Groups IIIa, IVa, Va, VIa, VIIa, VIII, Ib and IIb of the periodic table and C.

6. The optical information recording medium according to claim 5, wherein the Ge-containing layer is represented by $(Ge_{1-x}X_x)_aO_bN_c$ ($0 \leq x<1$, $0<a<1$, $0 \leq b<1$, $0<c<1$, $a+b+c=1$), and a composition ratio of (GeX), O and N in the Ge-containing layer has numerical values which lie within the range represented by the area GHIJ in a ternary phase diagram of (GeX), O and N, where the points G, H, I and J are as follows:

G $((GeX)_{90.0}N_{10.0})$, H $((GeX)_{83.4}O_{13.3}N_{3.3})$, I $((GeX)_{35.0}N_{65.0})$, J $((GeX)_{31.1}O_{55.1}N_{13.8})$.

7. The optical information recording medium according to claim 5, wherein a composition ratio of Ge and X in the Ge-containing layer is represented by $Ge_{1-k}X_k$ ($0<k \leq 0.5$).

8. The optical information recording medium according to claim 5, wherein X is at least one element selected from the group consisting of Ti, V, Cr, Mn, Cu, Zn, Zr, Nb, Mo, Pd, Ag, Cd, Hf, Ta, W, Fe, Co, Ni, Y, La and Au.

9. The optical information recording medium according to claim 8, wherein X is at least one element selected from the group consisting of Cr, Mo, Mn, Co, Ni, and La.

10. The optical information recording medium according to claim 1, wherein the recording medium is reversibly phase-changeable between a crystalline state and an amorphous state, and a reflectance of the crystalline state is lower than the reflectance of the amorphous state.

11. The optical information recording medium according to claim 1, wherein the protecting layer includes a sulfide.

12. A method for producing an optical information recording medium comprising:
  forming a first diffusion preventing layer;
  forming a recording layer having reversibly changeable optical characteristics in contact with the first diffusion preventing layer by sputtering with a target containing at least three elements of Ge, Te and Sb,
  wherein a composition ratio of Ge, Te and Sb in the target has numerical values which lie within the range represented by the area ABFE in a ternary phase diagram of Ge, Te and Sb, where the points A, B, F, and E are as follows:

A $(Ge_{50}Te_{50})$, B $(Ge_{22.5}Sb_{22.0}Te_{55.5})$, F $(Ge_{18.0}Sb_{37.6}Te_{44.4})$, E $(Ge_{65}Te_{35})$;

and
  forming a second diffusion preventing layer in contact with the recording layer, and
  forming a protecting layer formed of a dielectric containing sulfur or a sulfide in contact with the first diffusion preventing layer or the second diffusion preventing layer,
  wherein the first and second diffusion preventing layers are formed so as to contain at least one compound selected from the group consisting of an oxide, a nitride, a nitrogen oxide, a carbide and a fluoride as a main component and wherein the first and second diffusion layers are substantially free of sulfur and prevent atoms from diffusing between the recording layer and layers adjacent to the recording layer.

13. A method for producing an optical information recording according to claim 12, wherein the first and second diffusion preventing layers are formed in mixed gas including a rare gas and nitrogen.

14. The method for producing an optical information recording medium according to claim 12, wherein the protecting layer is formed so as to include a sulfide.

15. A method for recording and reproducing optical information with an optical information recording medium and laser beams, the optical information recording medium comprising:
  a substrate having a plurality of layers formed thereon, the plurality of layers further comprising:
    a first diffusion preventing layer; and a recording layer in contact with the first diffusion preventing layer; the recording layer having reversibly changeable optical characteristics and containing at least three elements of Ge, Te and Sb,
    wherein a composition ratio of Ge, Te and Sb in the recording layer having numerical values which lie within the range represented by the area ABFE in a ternary phase diagram of Ge, Te and Sb, where the points A, B, F, and E are as follows:

A $(Ge_{50}Te_{50})$, B $(Ge_{22.5}Sb_{22.0}Te_{55.5})$, F $(Ge_{18.0}Sb_{37.6}Te_{44.4})$, E $(Ge_{65}Te_{35})$, the plurality of layers further comprising a second diffusion preventing layer in contact with the recording layer; and
  a protecting layer formed of a dielectric containing sulfur or a sulfide in contact with the first diffusion preventing layer or the second diffusion preventing layer;
  wherein the first and second diffusion layers contain at least one compound selected from the group consisting of a oxide, a nitride, a nitrogen oxide, a carbide and a fluoride as a main component and wherein the first and second diffusion layers are substantially free of sulfur and prevent atoms from diffusing between the recording layer and layers adjacent to the recording layer; and
  the laser beams are focused on a microspot on the optical information recording medium,
  wherein a power level of the laser beams is fluctuated between a first power level $P_1$ and a second power level $P_2$ to change the optical information is selected from the group consisting of recording, erasing and overwriting.

16. The method for recording and reproducing optical information according to claim 15, wherein the laser beams have a wavelength of 680 nm or less.

17. A method for recording and reproducing optical information according to claim 15, wherein the laser beams have a linear velocity of 8 m/s or more.

18. The method for recording and reproducing optical information according to claim 15, wherein the optical recording medium has a guide groove for the laser beams and the minimun bit length in the direction along the guide groove is 0.40 µm/bit or less.

19. The method for recording and reproducing optical information according to claim 15, wherein the optical recording medium has a groove portion and a land portion, and the optical information is recorded in both of the groove portion and the land portion, and the average total width of the groove portion and the land portion in the direction normal to the groove portion is 1.40 µm or less.

20. The method for recording and reproducing optical information according to claim 15, wherein the protecting layer includes a sulfide.

* * * * *

UNITED STATES PATENT AND TRADEMARK OFFICE
CERTIFICATE OF CORRECTION

PATENT NO. : 6,503,690 B1
DATED : January 7, 2003
INVENTOR(S) : Uno et al.

It is certified that error appears in the above-identified patent and that said Letters Patent is hereby corrected as shown below:

<u>Title page,</u>
Item [56], References Cited, U.S. PATENT DOCUMENTS, "Sagiki et al." should read -- Sugiki et al. --.

Signed and Sealed this

Fourth Day of April, 2006

JON W. DUDAS
*Director of the United States Patent and Trademark Office*